April 1, 1924.
H. T. HOPS
1,488,816
OIL GAUGE FOR MOTOR VEHICLES
Filed March 2, 1923
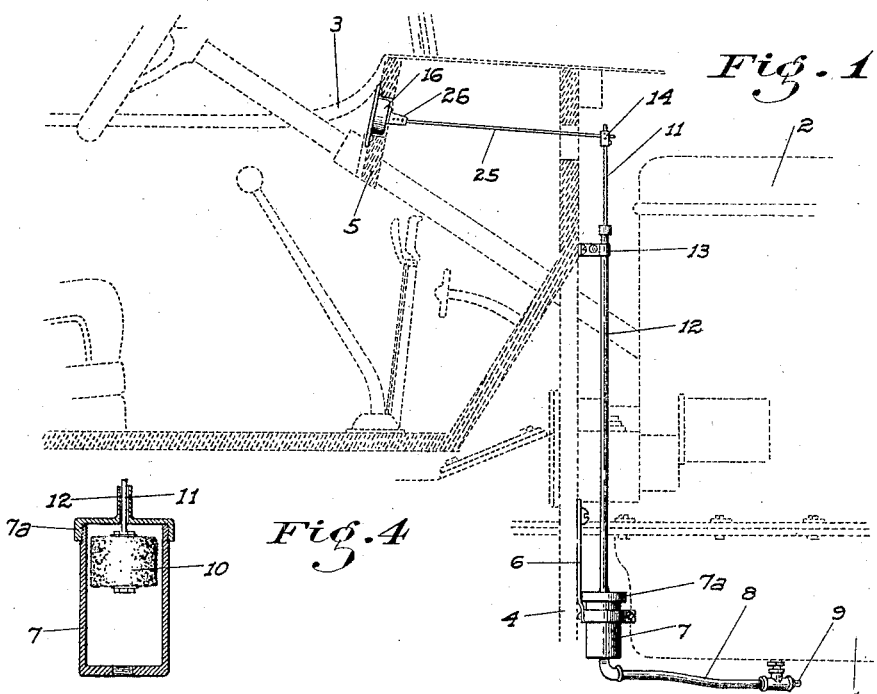
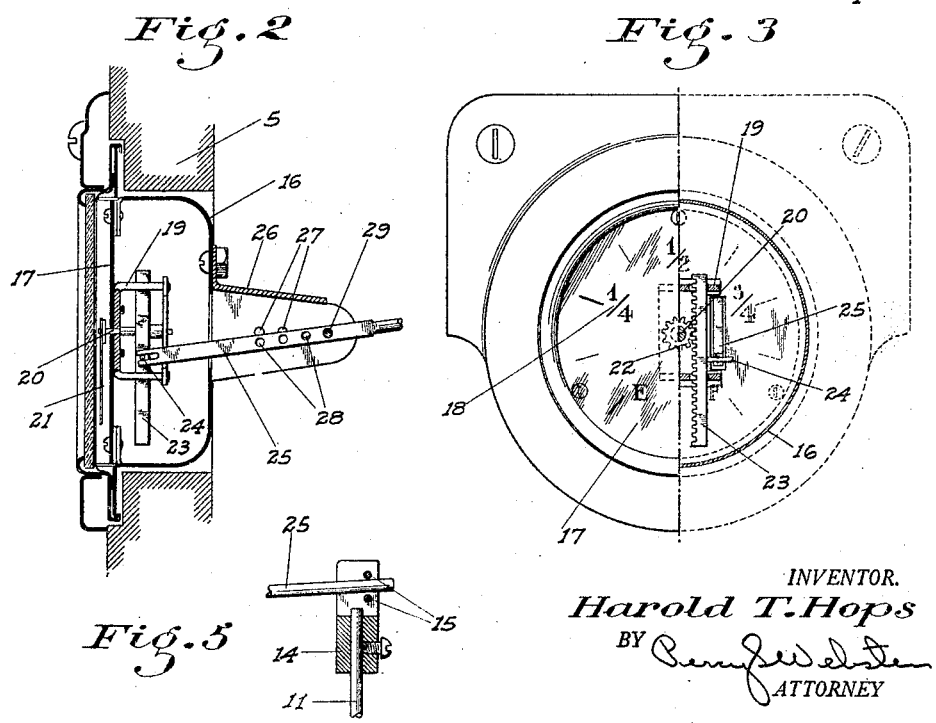
INVENTOR.
Harold T. Hops
BY
ATTORNEY Patented Apr. 1, 1924.

1,488,816

UNITED STATES PATENT OFFICE.

HAROLD T. HOPS, OF ACAMPO, CALIFORNIA.

OIL GAUGE FOR MOTOR VEHICLES.

Application filed March 2, 1923. Serial No. 622,293.

*To all whom it may concern:*

Be it known that I, HAROLD T. HOPS, a citizen of the United States, residing at Acampo, county of San Joaquin, State of California, have invented certain new and useful Improvements in Oil Gauges for Motor Vehicles; and I do declare the following to be a full, clear, and exact description of the same, reference being had to the accompanying drawings, and to the characters of reference marked thereon, which form a part of this application.

This invention relates to improvements in devices for indicating the quantity of oil in the crank case or other reservoir of the engine of a motor vehicle, and is particularly intended as an improvement over that type of oil gauge shown in my Patent No. 1,430,377, granted September 26th, 1922.

The principal objects of the present invention are to simplify the construction of the gauge and its operating mechanism; to enable sundry parts being made lighter and more compact without detracting from the efficiency of operation; and to enable a single model of the device being used on different vehicles and with different engines, by merely making certain slight adjustments.

These objects I accomplish by means of such structure and relative arrangement of parts as will fully appear by a perusal of the following specification and claims.

In the drawings similar characters of reference indicate corresponding parts in the several views:

Fig. 1 is a side outline of a portion of a motor vehicle adjacent the driver's compartment, showing my improved device as installed.

Fig. 2 is a cross section of the gauge.

Fig. 3 is a front view of the gauge, with one half the dial removed.

Fig. 4 is a vertical section, of the float and its cylinder, detached.

Fig. 5 is a vertical section of an arm connecting member and portions of its cooperating parts.

Referring now more particularly to the characters of reference on the drawings, the numeral 1 denotes the crank case of an engine 2, mounted on a vehicle the body 3 of which has a vertical transverse frame 4 at the rear of the engine, and the usual dash or instrument board 5 to the rear of said frame.

Secured to the frame 4 by means of a suitable clamping bracket 6 is a vertical cylinder 7, whose bottom is set about on a level with the lowest point of the crank case and which extends somewhat above the full level line of the oil carried in the crank case.

A pipe 8 is connected to the bottom of the cylinder 7 and also to the bottom of the crankcase, preferably in place of the usual drain plug therein, since I provide a drain plug 9 in said pipe.

Freely mounted in the cylinder 7 is a float 10 connected to and projecting upwardly from which is a stem 11 which is slidable in and projects above a tube 12 fixed on the cap 7ª of the cylinder 7. This tube is clamped to the frame 4 at any suitable point, as shown at 13.

Mounted on top of the stem 11 is a forked member 14 having a pair of vertically spaced pins 15 extending across the opening of said member.

Mounted on the dash board 5, and preferably set flush therewith is the gauge casing 16 having a face or dial 17 which carries suitable indicating or gauge marks as at 18.

Pivoted centrally of the dial in a frame 19 secured thereto is a shaft 20 which has a pointer or needle 21 which reads on the dial.

Mounted on said shaft back of the dial is a pinion 22 which is engaged by a vertical rack 23 slidably mounted in the frame 19. Projecting outwardly from the rack on the side thereof opposite to its teeth is a rigid pin 24 which is straddled by the slotted end of a lever arm 25 pivotally mounted in a bracket 26 on the outside of the casing 16, on the end of the latter opposite to the dial, the other end of the lever projecting between the pins 15 of the member 14 on the stem 11. The bracket 26 is provided with a plurality of horizontally disposed spaced holes 27, while the arm 25 is provided with similar holes 28 to aline therewith. In this manner, by placing the pivotal pin 29 through any corresponding sets of holes, the proportion of length of the lever on each side of said pin may be varied, thus altering the distance the outer or forward end of the lever will be moved compared to the movement at the casing end, which of course must be the same at all times, or enough to rotate the pointer from the "Empty" to the "Full" mark on the dial.

This enables the same model gauge being used with engines whose oil level drops say two inches from full to empty, as well as for others having a greater or lesser range of oil level.

The operation of the device needs no explanation, since it will be evident that as the level of the oil rises and falls in the cylinder, the float will rise up and down, and the lever will likewise be reciprocated, causing the rack to be moved up and down, and the pointer to be rotated around the dial.

It will of course be evident that the gauge may be set at any angle relative to the stem 11, without affecting the operation of the lever, in which case the member 14 is set at the necessary height on the stem 11, and the latter then cut off just below the pins 15.

From the foregoing description it will be readily seen that I have produced such a device as substantially fulfills the objects of the invention as set forth herein.

While this specification sets forth in detail the present and preferred construction of the device still in practice such deviations from such detail may be resorted to as do not form a departure from the spirit of the invention as defined by the appended claims.

Having now particularly described my invention what I claim as new and useful and desire to secure by Letters Patent is:

1. A gauge for liquid reservoirs including an indicating dial, a rotatable finger co-operating therewith, a lever pivoted at a fixed point with respect to the dial, a pinion fixed in connection with the finger, a rack engaging the pinion, a connection between one end of the rack and the lever, and means controlled by a change of level of the liquid connected to the opposite end of the lever.

2. A gauge for liquid reservoirs including an indicating dial, a rotatable finger co-operating therewith, a lever pivoted at a fixed point with respect to the dial, a pinion fixed in connection with the finger, a rack engaging the pinion and slidably mounted for movement in a plane parallel to that of the movement of the lever and positioned substantially at right angles to the latter, a swivel connection between one end of the lever and the rack, a float controlled stem, and a swivel connection between the opposite end of the lever and the stem.

3. A gauge for liquid reservoirs including an indicating dial, a rotatable finger co-operating therewith, a lever pivoted at a fixed point with respect to the dial, a pinion fixed in connection with the finger, a rack engaging the pinion and slidably mounted for movement in a plane parallel to that of the movement of the lever and positioned substantially at right angles to the latter, a pin projecting from one side of the rack toward the lever, the adjacent end of the latter being slotted and straddling said pin, a float controlled stem projecting up adjacent the other end of the lever, and a connection between said other end of the lever and the stem causing vertical movement of the lever with a corresponding movement of the stem while allowing horizontal sliding movement of said lever.

4. A gauge for liquid reservoirs comprising a casing an indicating dial thereon, a rotatable finger co-operating with the dial, a lever projecting into the casing behind the dial, a bracket on the casing having a plurality of holes spaced lengthwise of the lever, the latter having holes to aline therewith, a pivoting member passed through any at a time of such alined holes, means in the casing between the adjacent end of the lever and the finger for causing rotation of the latter with a movement of the lever about its fulcrum, and means controlled by a change of level of the liquid connected to the outer end of the lever.

In testimony whereof I affix my signature.

HAROLD T. HOPS.